Hoffman & Johnston,
Nut Lock.

No. 104,033. Patented June 7, 1870.

Witnesses:
E. R. Brown
C. C. Sheaker

D. Hoffman
W. Johnston
Inventors,
by J. C. Sheaker
att

UNITED STATES PATENT OFFICE.

DANIEL HOFFMAN, OF NOBLESTOWN, AND WILLIAM JOHNSTON, OF HAVELOCK, PENNSYLVANIA.

IMPROVEMENT IN NUT-LOCKS.

Specification forming part of Letters Patent No. 104,033, dated June 7, 1870.

*To all whom it may concern:*

Be it known that we, DANIEL HOFFMAN, of Noblestown, in the county of Allegheny, and WILLIAM JOHNSTON, of Havelock, in the county of Washington and State of Pennsylvania, have invented a new and useful Improved Nut and Locking Device; and we do hereby declare that the following is a full, clear, and exact description thereof, sufficient to enable those skilled in the art to which our invention appertains to make and use the same.

The nature of our invention consists in forming nuts with projecting flanges and locking them by means of notched plates or bars.

Figure 1:
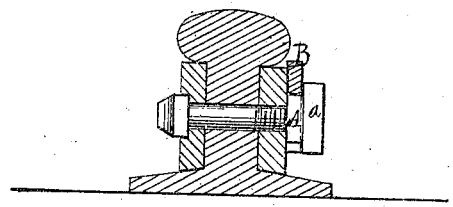
Figure 2:
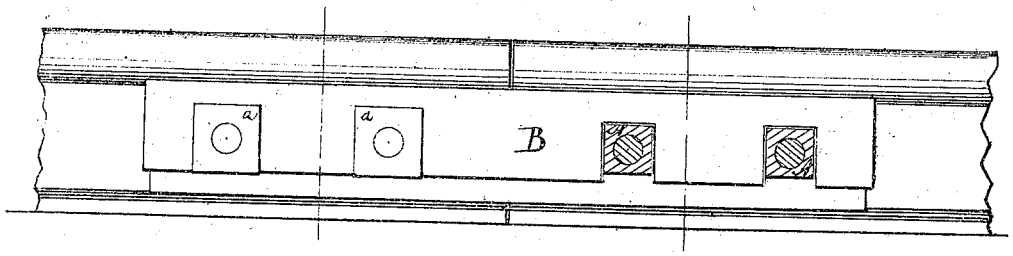
Figure 3:
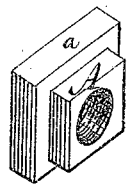

In the drawings, Figure 1 is a transverse vertical section of our improvement applied to a rail-joint. Fig. 2 is a side view of the same. Fig. 3 is a perspective view of one of the nuts.

The nuts A are formed with flanges $a$, projecting from their edges, as shown in Fig. 3. When used in a rail-joint, the nuts are prevented from turning by means of a notched plate or bar, B, as shown in Figs. 1 and 2.

The ends of the rails are secured by fish-plates and bolts in the usual manner, the bolts passing through the rails and fish-plates, one of which is formed with depressions with which the heads of the bolts engage, and the bolts are thus prevented from turning. When the nuts are screwed up to their places on the bolts, the notched plate or bar B is slipped over them, as shown in Figs. 1 and 2. The notches, being of the same shape and size as the nuts, prevent the nuts from turning, and the flanges $a$ prevent the plate or bar B from being displaced.

What we claim as new, and desire to secure by Letters Patent, is—

The nuts A, formed with the flanges $a$, in combination with the notched plate or bar B, as shown and described.

DANL. HOFFMAN.
WM. JOHNSTON.

Witnesses:
ORLANDO BELL,
JAMES B. KERR.